US011511360B2

(12) United States Patent
Kiguchi et al.

(10) Patent No.: US 11,511,360 B2
(45) Date of Patent: Nov. 29, 2022

(54) MACHINING METHOD, METHOD FOR MANUFACTURING PLANETARY CARRIER, AND PLANETARY CARRIER

(71) Applicant: SUMITOMO ELECTRIC SINTERED ALLOY, LTD., Okayama (JP)

(72) Inventors: Hirofumi Kiguchi, Okayama (JP); Daisuke Harimoto, Okayama (JP)

(73) Assignee: SUMITOMO ELECTRIC SINTERED ALLOY, LTD., Okayama (JP)

( * ) Notice: Subject to any disclaimer, the term of this patent is extended or adjusted under 35 U.S.C. 154(b) by 163 days.

(21) Appl. No.: 16/640,438

(22) PCT Filed: Aug. 24, 2018

(86) PCT No.: PCT/JP2018/031374
§ 371 (c)(1),
(2) Date: Feb. 20, 2020

(87) PCT Pub. No.: WO2019/058872
PCT Pub. Date: Mar. 28, 2019

(65) Prior Publication Data
US 2020/0189014 A1 Jun. 18, 2020

(30) Foreign Application Priority Data
Sep. 20, 2017 (JP) .............................. JP2017-180570

(51) Int. Cl.
*F16H 57/08* (2006.01)
*B23F 1/06* (2006.01)

(52) U.S. Cl.
CPC ............. *B23F 1/06* (2013.01); *F16H 57/082* (2013.01)

(58) Field of Classification Search
CPC . B22F 2003/245; B22F 2003/247; B23C 3/34
See application file for complete search history.

(56) References Cited

U.S. PATENT DOCUMENTS 5,642,970 A * 7/1997 Yamaguchi ............... B23C 3/34
29/888.022
2018/0290222 A1 * 10/2018 Andreasson ........... B23D 47/12

FOREIGN PATENT DOCUMENTS

| JP | 2008-256106 | 10/2008 |
| JP | 2009-256723 | 11/2009 |
| JP | 2017-106085 | 6/2017 |

OTHER PUBLICATIONS

Mechanical Technology, Type of Milling Cutters, available at http://4mechtech.blogspot.com/2014/07/type-of-milling-cutters.html, Screen shot taken on May 27, 2015 (Year: 2015).*

* cited by examiner

*Primary Examiner* — Moshe Wilensky
*Assistant Examiner* — Kyle A Cook
(74) *Attorney, Agent, or Firm* — IPUSA, PLLC (57) ABSTRACT

A machining method for forming an opening through a workpiece, serving as a green compact, by moving a milling tool in a radial direction relative to the workpiece is provided. The milling tool includes a first milling tool and a second milling tool. The method includes a pre-machining step of using the first milling tool, and forming the first sidewall surface by rotating the first milling tool so as to cause cutting edges of the first milling tool to cut the workpiece from the acute angle corner to the obtuse angle corner, while leaving a cutting allowance on the second sidewall surface; and a post-machining step of using the second milling tool whose cutting edges are reversed from the cutting edges of the first milling tool, and forming the second sidewall surface by rotating the second milling tool (Continued)

so as to cause the cutting edges of the second milling tool to cut the cutting allowance from the acute angle corner to the obtuse angle corner.

8 Claims, 5 Drawing Sheets

MACHINING METHOD, METHOD FOR MANUFACTURING PLANETARY CARRIER, AND PLANETARY CARRIER

TECHNICAL FIELD

The present disclosure relates to a machining method, a method for manufacturing a planetary carrier, and the planetary carrier.

The present application is based on and claims priority to Japanese patent application No. 2017-180570, filed on Sep. 20, 2017, with the Japanese Patent Office, the entire contents of which are hereby incorporated by reference.

BACKGROUND ART

Patent Document 1 discloses a method for manufacturing a sintered body by machining an unsintered green compact into a predetermined shape and sintering the green compact. As one example of the method, a machining center is used to machine a green compact and the machined green compact is sintered to produce a planetary carrier.

RELATED-ART DOCUMENTS

Patent Documents

Patent Document 1: Japanese Laid-open Patent Publication No. 2017-106085

SUMMARY OF THE INVENTION

According to the present disclosure, a machining method for forming an opening through a workpiece, serving as a green compact, by moving a milling tool in a radial direction relative to the workpiece is provided. Among inner wall surfaces defining the opening, respective surfaces cut by cutting edges on an outer periphery of the milling tool are defined as a first sidewall surface and a second sidewall surface that is opposite the first sidewall surface, a side from which the milling tool enters is defined as an outer circumferential surface of the workpiece and a surface opposite to the outer circumferential surface is defined as an inner circumferential surface of the workpiece, a corner where the first sidewall surface or the second sidewall surface and the outer circumferential surface meet is defined as an obtuse angle corner, a corner where the first sidewall surface or the second sidewall surface and the inner circumferential surface meet is defined as an acute angle corner, and the milling tool includes a first milling tool and a second milling tool. The method includes a pre-machining step of using the first milling tool, and forming the first sidewall surface by rotating the first milling tool so as to cause cutting edges of the first milling tool to cut the workpiece from the acute angle corner to the obtuse angle corner, while leaving a cutting allowance on the second sidewall surface; and a post-machining step of using the second milling tool whose cutting edges are reversed from the cutting edges of the first milling tool, and forming the second sidewall surface by rotating the second milling tool so as to cause the cutting edges of the second milling tool to cut the cutting allowance from the acute angle corner to the obtuse angle corner.

MODE FOR CARRYING OUT THE INVENTION

Problem to be Solved by the Present Disclosure

A green compact is produced simply by pressing and solidifying metal powder through pressure molding. Therefore, unlike a sintered body that has been subjected to sintering, the particles of the metal powder are not bonded to each other. In the green compact, the particles of the metal powder are mechanically entangled to maintain the shape. For this reason, when an unsintered green compact is cut by a cutting tool, the unsintered green compact can be readily cut and machining costs can be thus reduced, as compared to when a sintered body that has been subjected to sintering is cut. However, unlike the sintered body, the particles in the green compact are not strongly bonded. Thus, the green compact is brittle and tends to be readily chipped by cutting. For example, when an opening is formed through the inner and outer surfaces of the green compact by cutting the green compact, a corner of a side from which the cutting tool exits may be chipped.

In view of the above, it is an object of the present disclosure to provide a machining method in which an opening is formed through a green compact by a milling tool without chipping the sidewall surfaces of the opening.

Effects of the Present Disclosure

In a machining method according to the present disclosure, an opening can be formed through a green compact by a milling tool without chipping the sidewall surfaces of the opening.

DESCRIPTION OF EMBODIMENTS OF THE PRESENT DISCLOSURE

When an opening is formed through the inner and outer surfaces of a workpiece, which is a green compact, by moving a milling tool (such as a side milling cutter) in the radial direction relative to the workpiece, cut surfaces are formed along the rotation trajectory of cutting edges of the milling tool. The cut surfaces are defined as sidewall surfaces of the opening, from among the inner wall surfaces defining the opening. When the side on the workpiece from which the milling tool enters (from which the cutting edges are inserted) is defined as an outer surface side, a corner formed by the sidewall surface and the outer surface of the workpiece has an obtuse angle, and a corner formed by the sidewall surface and the inner surface of the workpiece has an acute angle.

If an opening is formed by rotating the milling tool in one direction, one cut surface (one sidewall surface) is formed by the cutting edges cutting through the workpiece from the acute angle side to the obtuse angle side, and the other cut surface (the other sidewall surface) is formed by the cutting edges cutting through the workpiece from the obtuse angle side to the acute angle side. At this time, the corner on the acute angle side of the other sidewall surface, from which the cutting edges exit, tends to be chipped. The reason for the chipping is considered to be because the corner on the acute angle side cannot withstand the cutting force when the cutting edges cut the workpiece from the obtuse angle side to the acute angle side, as compared to when the cutting edges cut the workpiece from the acute angle side to the obtuse angle side. In the following, embodiments of the present disclosure will be listed and described.

(1) According to an embodiment of the present disclosure, a machining method for forming an opening through a workpiece, serving as a green compact, by moving a milling tool in a radial direction relative to the workpiece is provided. In the machining method, among inner wall surfaces defining the opening, respective cut surfaces are defined as a first sidewall surface and a second sidewall surface, the respective cut surfaces being cut by cutting edges on an outer periphery of the milling tool and the second sidewall surface being opposite the first sidewall surface, a side from which the milling tool enters is defined as an outer circumferential surface of the workpiece, a surface opposite to the outer circumferential surface is defined as an inner circumferential surface of the workpiece, a corner where the first sidewall surface or the second sidewall surface and the outer circumferential surface meet is defined as an obtuse angle corner, a corner where the first sidewall surface or the second sidewall surface and the inner circumferential surface meet is defined as an acute angle corner, and the milling tool includes a first milling tool and a second milling tool. The machining method includes a pre-machining step of using the first milling tool, and forming the first sidewall surface by rotating the first milling tool so as to cause cutting edges to cut the workpiece from the acute angle corner to the obtuse angle corner, while leaving a cutting allowance on the second sidewall surface; and a post-machining step of using the second milling tool whose cutting edges are reversed from the cutting edges of the first milling tool, and forming the second sidewall surface by rotating the second milling tool so as to cause the cutting edges to cut the cutting allowance from the acute angle corner to the obtuse angle corner.

According to the above-described machining method, in order to form an opening through the inner and outer surfaces of the green compact by cutting the green compact, in the pre-machining step, the first milling tool is used, and the first sidewall surface is formed by rotating the first milling tool so as to cause the cutting edges to cut the workpiece from the acute angle corner to the obtuse angle corner. Then, in the post-machining step, the second milling tool whose cutting edges are reversed from the cutting edges of the first milling tool is used, and the second sidewall surface is formed by rotating the second milling tool so as to cause the cutting edges to cut the cutting allowance from the acute angle corner to the obtuse angle corner. Because the sidewall surfaces are formed by cutting the workpiece from the acute angle side to the obtuse angle side by the cutting edges, chipping does not readily occur. Accordingly, it is possible to minimize chipping of the acute angle corners on the sidewall surfaces.

Further, the cutting allowance is left on the second sidewall surface in the pre-machining step, and the cutting allowance of the second sidewall surface is cut in the post-machining step. Therefore, even if the acute angle corner on the second sidewall surface, from which the cutting edges exit, is chipped, the chipped corner on the cutting allowance is removed. Accordingly, no chip remains on the corner on the acute angle side of the second sidewall surface. In the above-machining method, it is possible to form an opening through the inner and outer surfaces of the green compact by the milling tools without chipping the sidewall surfaces of the opening.

(2) According to one aspect of the above-described machining method, the first milling tool and the second milling tool are staggered tooth side milling cutters.

According to the above-described one aspect, by using the staggered tooth side milling cutters as the milling tools, the cutting resistance can be reduced, and thus the occurrence of chips can be minimized. The staggered tooth has a structure in which multiple cutting edges are arranged in the circumferential direction of a side milling cutter, and are alternately offset in the thickness direction of the side milling cutter.

(3) According to one aspect of the above-described machining method, the workpiece is a green compact for a planetary carrier.

Briefly, the planetary carrier has column portions, and disk-shaped plate portions formed on both ends of the column portions, and openings are formed between the column portions. Example configurations of the green compact, which is the workpiece, for the planetary carrier, include a configuration in which disk-shaped plate portions are formed on both sides of a body portion having a circular tubular shape. When a planetary carrier is manufactured, the body portion of the green compact for the planetary carrier is cut so as to form column portions having a plurality of openings therebetween in the circumferential direction. As a result, the green compact can be formed in the shape of the planetary carrier. In the machining method according to the above-described one aspect, the sidewall surfaces of an opening can be cut with no chip. Therefore, a planetary carrier without chipping the sidewall surfaces of the column portions can be manufactured.

(4) According to one aspect of the above-described machining method, a center of rotation of the first milling tool is located on a side closer to the first sidewall surface relative to a centerline that passes through a center in a circumferential direction of an opening and a center of the outer circumferential surface, and in the post-machining step, a center of rotation of the second milling tool is located on a side closer to the second sidewall surface relative to the centerline.

According to the above-described one aspect, a cutting allowance can be left in an efficient manner. Accordingly, when an opening is formed through the inner and outer surfaces of the green compact by the milling tools in the above-described machining method, no chip is formed on the sidewall surfaces of the opening.

(5) According to an embodiment of the present disclosure, a method for manufacturing a planetary carrier is provided. The planetary carrier has a plurality of column portions and plate portions. The plate portions are formed on both ends of the column portions and openings are formed between the column portions. The method includes a preparation step of preparing a green compact by integrally forming the plate portions on both ends of a body portion having a circular tubular shape; a machining step of forming the openings through the body portion by using a milling tool to cut the body portion of the green compact, so as to form the column portions between the openings; and a sintering step of sintering the machined green compact. In the machining step, among inner wall surfaces defining an opening, respective cut surfaces are defined as a first sidewall surface and a second sidewall surface, the respective cut surfaces being cut by cutting edges on an outer periphery of the milling tool and the second sidewall surface being opposite the first sidewall surface, a side from which the milling tool enters is defined as an outer circumferential surface of the body portion, a surface opposite to the outer circumferential surface is defined as an inner circumferential surface of the body portion, a corner where the first sidewall surface or the second sidewall surface and the outer circumferential surface meet is defined as an obtuse angle corner, a corner where the first sidewall surface or the second sidewall surface and the inner circumferential surface meet is defined as an acute angle corner, and the milling tool includes a first milling tool and a second milling tool. The machining step includes a pre-machining step of using the first milling tool, and forming the first sidewall surface by rotating the first milling tool so as to cause cutting edges of the first milling tool to cut the body portion from the acute angle corner to the obtuse angle corner, while leaving a cutting allowance on the second sidewall surface; and a post-machining step of using the second milling tool whose cutting edges are reversed from the cutting edges of the first milling tool, and forming the second sidewall surface by rotating the second milling tool so as to cause the cutting edges of the second milling tool to cut the cutting allowance from the acute angle corner to the obtuse angle corner.

According to the above-described method for manufacturing a planetary carrier, when an opening is formed through the inner and outer surfaces of the green compact by the milling tools no chip is formed on the sidewall surfaces of the opening. Accordingly, a planetary carrier having no chip on the sidewall surfaces of each of the column portions can be manufactured. Further, the column portion and the both plate portions can be integrally formed.

(6) According to one aspect of the above-described method for manufacturing the planetary carrier, a center of rotation of the first milling tool is located on a side closer to the first sidewall surface relative to a centerline that passes through a center in a circumferential direction of the opening and a center of the outer circumferential surface, and in the post-machining step, a center of rotation of the second milling tool is located on a side closer to the second sidewall surface relative to the centerline.

According to the above-described one aspect, a cutting allowance can be left in an efficient manner. Accordingly, when an opening is formed through the inner and outer surfaces of the green compact by the milling tools in the above-described machining method, no chip is formed on the sidewall surfaces of the opening.

(7) According to an embodiment of the present disclosure, a planetary carrier includes a plurality of plate portions; and column portions connecting the plurality of plate portions. The column portions each have an outer circumferential surface, an inner circumferential surface, and sidewall surfaces, the sidewall surfaces are each formed in a circular arc shape, the circular arc shape having a center on an outer circumferential side in a cross section perpendicular to a shaft of the planetary carrier, and the plurality of plate portions and the column portions are integrally formed as one sintered body.

In the above-described planetary carrier, the sidewall surfaces of each of the column portions are formed in circular arc shapes by machining the green compact by the milling tools. Accordingly, in the above-described planetary carrier, the plate portions and the column portions are integrally formed, and no chip is formed on the sidewall surfaces of each of the column portions. Further, because the sidewall surfaces are each formed in a circular arc shape, the strength of the column portions can be increased.

DETAILS OF EMBODIMENTS OF PRESENT DISCLOSURE

A specific example of a machining method according to an embodiment of the present disclosure will be described with reference to the drawings. In the drawings, the same elements are denoted by the same reference numerals. The present invention is not limited to the specific example, and is defined by the scope of the claims and is intended to include any modifications within the scope and meaning equivalent to the scope of the claims.

<Summary of Machining Method>

The machining method according to the embodiment is a method for forming an opening through the inner and outer surfaces of a workpiece by moving a milling tool in a radial direction relative to the workpiece, and includes a pre-machining step and a post-machining step. In the machining method, among inner wall surfaces defining the opening, respective cut surfaces, cut by cutting edges on an outer periphery of the milling tool, are defined as a first sidewall surface and a second sidewall surface that is opposite the first sidewall surface. A corner where the sidewall surface and the outer surface of the workpiece meet is defined as an obtuse angle corner, and a corner where the sidewall surface and the inner surface of the workpiece meet is defined as an acute angle corner.

In the machining method according to the embodiment, in the pre-machining step, a first milling tool is used as the milling tool, and the first sidewall surface is formed by rotating the first milling tool so as to cause cutting edges to cut the workpiece from the acute angle corner to the obtuse angle corner. In the post-machining step, as the milling tool, a second milling tool whose cutting edges are reversed from the cutting edges of the first milling tool is used, and the second sidewall surface is formed by rotating the second milling tool so as to cause the cutting edges to cut the workpiece from the acute angle corner to the obtuse angle corner. One of features of the machining method according to the embodiment is that in the pre-machining step, while the first sidewall surface is formed, a cutting allowance is left on the second sidewall surface. Then, in the post-machining step, the second sidewall surface is formed by cutting the cutting allowance. In the following, the machining method according to the embodiment will be described with reference to FIG. 1 through FIG. 5. As used herein, the cutting allowance refers to a portion that has not been subjected to machining and is left on the second sidewall surface.

Figure 1:
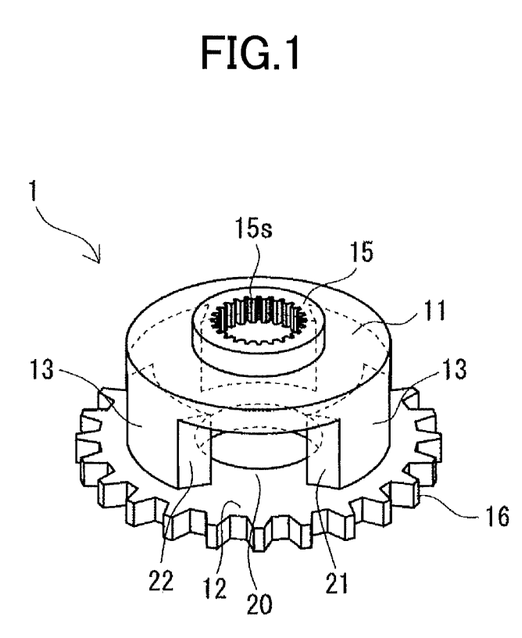
FIG. 1 is a schematic perspective view of an example of a planetary carrier.

In the following, an example, in which the machining method according to the embodiment is used to machine an unsintered green compact when a sintered component as illustrated in FIG. 1 is manufactured, will be described. The sintered component illustrated in FIG. 1 is a planetary carrier 1 used in automobile transmissions. The planetary carrier 1 includes a pair of disk-shaped plate portions 11 and 12 disposed facing each other while being spaced apart from each other, and a plurality of (three, in this example) column portions 13 that connects the plate portions 11 and 12. A plurality of (three, in this example) openings 20 are formed between the column portions 13. Herein, the plate portion 11 side is referred to as the upper side, and the plate portion 12 side is referred to as the lower side. A boss 15 having a shaft hole is provided at the center of the upper surface of the plate portion 11. Splines 15s are formed on the inner circumferential surface of the boss 15. Gear teeth 16 are formed on the outer circumferential surface of the plate portion 12. Planetary gears (not illustrated) are rotatably provided in the openings 20.

Figure 2:
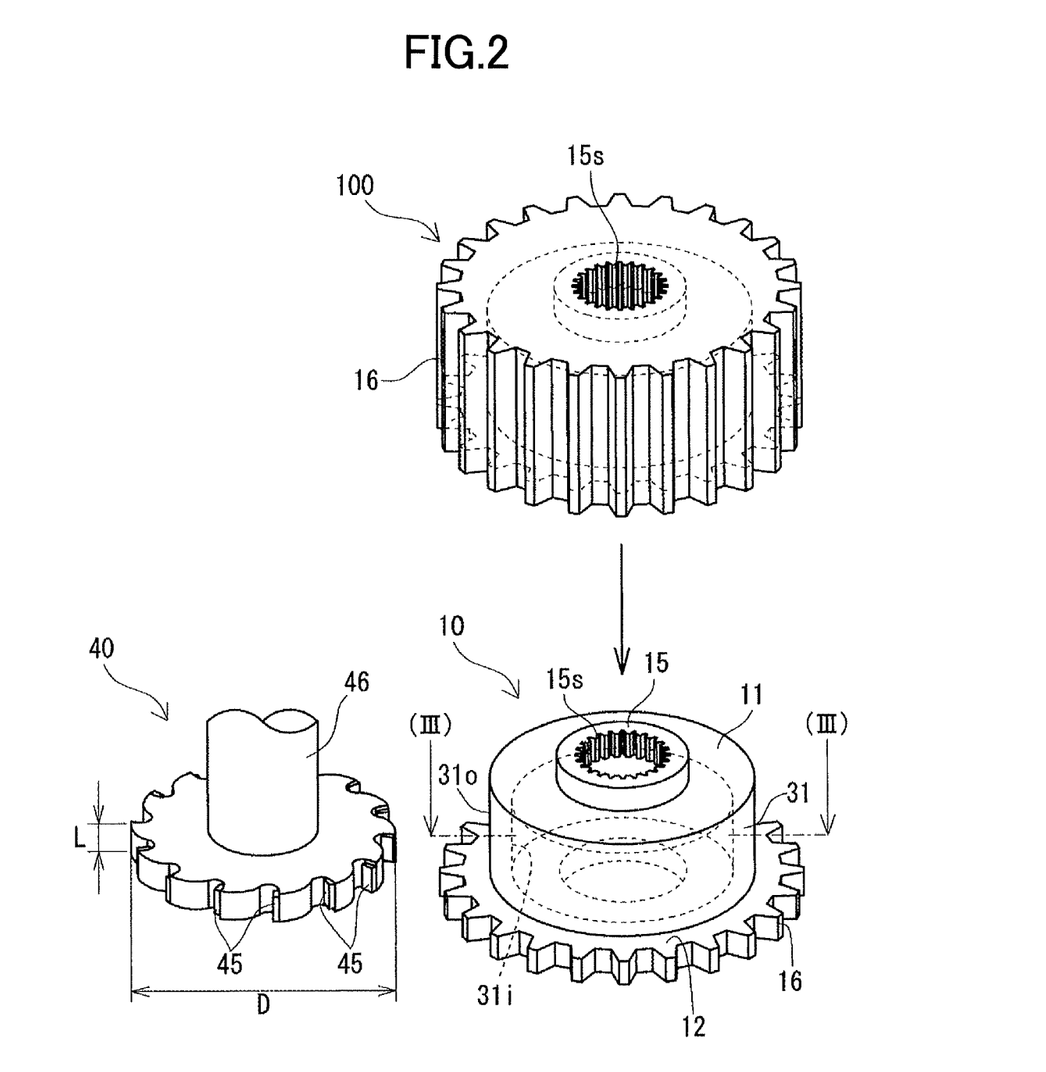
FIG. 2 is a schematic perspective view of an example of a green compact for the planetary carrier.

A workpiece before being machined into the shape of the planetary carrier 1 illustrated in FIG. 1 is a green compact 10 for the planetary carrier as illustrated in the lower part of FIG. 2. The green compact 10 has a configuration in which the disk-shaped plate portions 11 and 12 are formed at both ends of a body portion 31 having a circular tubular shape, and the boss 15 having the shaft hole is provided on the upper surface of the plate portion 11. The green compact 10 illustrated in FIG. 2 is produced by using a machining center to subject a green compact 100 having a circular tubular shape to machining such as cutting and drilling, and shaving the green compact 100 as one body. Therefore, the body portion 31 and the plate portions 11 and 12 of the green compact 10 are integrally formed. An outer circumferential surface 31o and an inner circumferential surface 31i are formed by machining the body portion 31 of the green compact 10.

The green compact 100 illustrated in the upper part of FIG. 2 is produced by uniaxially pressing raw material powder including metal powder with a die. The splines 15s are formed on the inner circumferential surface of the boss 15, and the gear teeth 16 are formed on the outer circumferential surface of the plate portion 12 by the die. The pressure (contact pressure) during pressure molding may be 600 MPa or higher, and further, 1000 MPa or higher. By increasing the contact pressure, the relative density of the green compact 100 can be increased. As a result, the relative density of a sintered component obtained by sintering can be increased, thereby increasing strength. The upper limit of the contact pressure is not particularly specified. As an example, the upper limit of the contact pressure may be 1200 MPa or less. The relative density of the green compact 100 may be 85% or more, and further, 90% or more. As used herein, the "relative density" refers to the actual density relative to the true density (the percentage of [measured density/true density]). The true density refers to the density of the metal powder used for the raw material powder.

<Metal Powder>

The metal powder used for the raw material powder is a main material forming the sintered component. Examples of the metal powder include powder of various types of metal such as iron and iron alloy composed mainly of iron (an iron-based material), aluminum or aluminum alloy composed mainly of aluminum (an aluminum-based material), and copper or copper alloy composed mainly of copper (a copper-based material). For mechanical components such as planetary carriers, iron-based powder such as pure iron powder or iron alloy powder is typically used. As used herein, "composed mainly of" means that a material contains, as its component, an element in an amount of more than 50% by mass, preferably 80% by mass or more, and more preferably 90% by mass or more. Examples of the iron alloy include an alloy containing at least one of alloying elements selected from Cu, Ni, Sn, Cr, Mo, Mn, and C. The above-described alloying elements contribute to improvement in the mechanical properties of the sintered component made of the iron-based material. Among the above-described alloying elements, Cu, Ni, Sn, Cr, Mn, and Mo may be contained in a total amount of 0.5% by mass to 6.0% by mass inclusive, and further, 1.0% by mass to 3.0% by mass inclusive. The content of C may be 0.2% by mass to 2.0% by mass inclusive, and further, from 0.4% by mass to 1.0% by mass inclusive. The metal powder used may be iron powder, and powder of any of the above-described alloying elements (alloying powder) may be added to the iron powder. In such as case, iron reacts with the alloying element when the machined green compact is sintered, and is thereby alloyed. The content of the alloying element may be appropriately determined in accordance with the application and specification of the manufactured sintered component.

The average particle diameter of the metal powder may be greater than or equal to 20 µm, and further, within a range greater than or equal to 50 µm to less than or equal to 150 µm. When the average particle diameter of the metal powder is within the above range, the metal powder can be readily handled and molded. The average particle diameter of the metal powder is the average particle diameter of particles included in the metal powder, and is a particle diameter (D50) at which a cumulative volume in a volumetric particle size distribution measured by a laser diffraction particle size distribution measurement apparatus is 50%.

<Details of Machining Method>

In the present embodiment, the green compact 10 for the planetary carrier illustrated in the lower part of FIG. 2 is used as a workpiece, and the body portion 31 of the green compact 10 is cut by a milling tool 40, thereby forming the openings (see FIG. 3) through the inner and outer surfaces of the body portion 31. The green compact 10 is fixed to a pedestal (not illustrated), with the plate portion 11 being on the upper side and the plate portion 12 being on the lower side. The milling tool 40 has cutting edges 45 on the outer circumference, and the cutting edges 45 are attached to a rotating shaft 46 so as to face the body portion 31 of the green compact 10. The milling tool 40 can be moved in the radial direction (horizontal direction) relative to the green compact 10. In this example, the outer circumferential surface 31o of the body portion 31 is regarded as the outer surface, and the inner circumferential surface 31i is regarded as the inner surface. The milling tool 40 enters from the outer circumferential surface 31o side of the body portion 31.

<Milling Tool>

The milling tool 40 illustrated in FIG. 2 is a milling cutter having the cutting edges 45 on the outer circumference. In this example, a side milling cutter is used as the milling tool 40. The cutting edges 45 are formed of cemented carbide, high-speed steel, cermet, or the like.

The plurality of cutting edges 45 (cutting insert) are formed on the outer circumference of a disk-shaped body of the milling tool 40 (side milling cutter) in the rotation direction. In this example, the milling tool 40 is, what is known as, a staggered tooth side milling cutter in which the plurality of cutting edges 45 are arranged in the circumferential direction and are alternately offset in the thickness direction of the milling tool 40. A boss hole, through which the rotating shaft 46 is attached, is formed at the center of the milling tool 40. The rotating shaft 46 causes the milling tool 40 to rotate. The size of the milling tool 40 may be appropriately selected in accordance with the size (length in the circumferential direction) of the openings 20 (see FIG. 3) to be formed. The milling tool 40 may have an outer diameter D of 30 mm or more to 130 mm or less, and a thickness L of 4 mm or more to 16 mm or less. In this example, the outer diameter D is 100 mm, and the thickness L is 12 mm.

Figure 3:
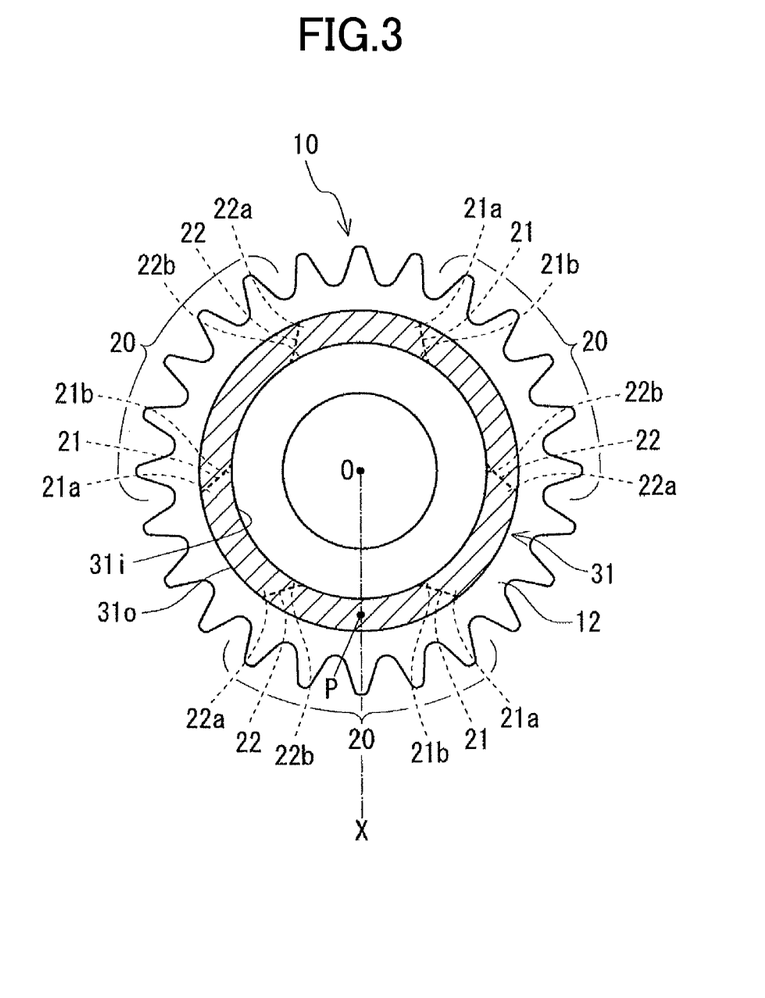
FIG. 3 is a schematic cross-sectional view of the green compact taken through of FIG. 2.

In the following, the pre-machining step and the post-machining step will be described with reference to FIG. 3 through FIG. 5. FIG. 3 is a cross-sectional view of the body portion 31 of the green compact 10 before an opening 20 is formed. Dotted lines in FIG. 3 denote a first sidewall surface 21 and a second sidewall surface 22 of the opening 20 to be formed. Further, in the figures, O represents a center of the body portion 31, P represents a center in the circumferential direction of the opening 20, X represents a centerline passing through OP, $O_1$ represents a center of rotation of a first milling tool 41, and $O_2$ represents a center of rotation of a second milling tool 42, as appropriate. The center O of the body portion 31 coincides with the center of the outer circumferential surface 31o.

As illustrated in FIG. 3, the first sidewall surface 21 and the second sidewall surface of the opening 20 are formed in circular arc-shapes. When the opening 20 is formed in the body portion 31, obtuse angle corners 21a and 22a formed by the first sidewall surface 21 or the second sidewall surface 22 and the outer circumferential surface 31o have obtuse angles, and acute angle corners 21b and 22b formed by the first sidewall surface 21 or the second sidewall surface 22 and the inner circumferential surface 31i have acute angles (see FIG. 5 also).

(Pre-Machining Step)

Figure 4:
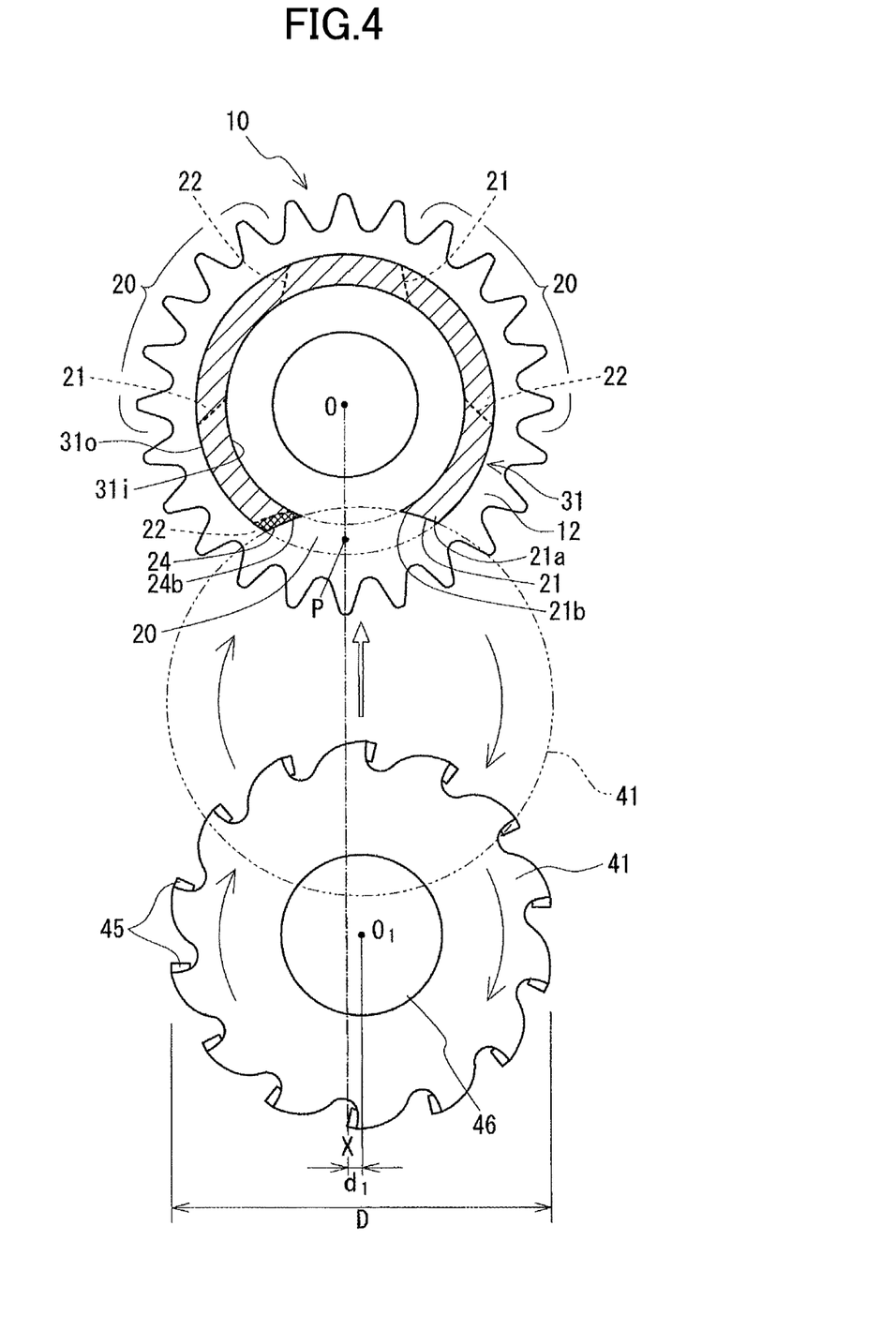
FIG. 4 is a schematic view that depicts a pre-machining step according to an embodiment.

In the pre-machining step, as illustrated in FIG. 4, the first milling tool 41 is used, and the first sidewall surface 21 is formed by rotating the first milling tool 41 so as to cause cutting edges 45 to cut the body portion from the acute angle side (side on which the acute angle corner 21b is formed) to the obtuse angle side (side on which an obtuse angle corner 21a is formed). The first milling tool 41 is a staggered tooth side milling cutter as described above, and rotates to the right (clockwise). A center of rotation $O_1$ of the milling tool 41 is set to a position shifted from the centerline X toward the first sidewall surface 21 side (toward the right side of FIG. 4).

When the first milling tool 41 is used for cutting, the first milling tool 41 is horizontally moved in parallel to centerline X and enters from the outer circumferential surface 31o side of the body portion 31, with the center of rotation $O_1$ being shifted toward the first sidewall surface 21 side. Accordingly, the body portion 31 is cut by the cutting edges 45 of the milling tool 41, and the first sidewall surface 21 defining an opening 20 is thereby formed. At this time, the first sidewall surface 21 having a circular arc shape is formed along the rotation trajectory (indicated by a long-dash double-short-dash line in FIG. 4) of the cutting edges 45 of the milling tool 41. Further, the obtuse angle corner 21a having an obtuse angle formed by the first sidewall surface 21 and the outer circumferential surface 31o, and the acute angle corner 21b having an acute angle formed by the first sidewall surface 21 and the inner circumferential surface 31i are formed. The radius of curvature of the first sidewall surface 21 is determined by the outer diameter D of the milling tool 41.

Further, the first sidewall surface 21 is formed while leaving a cutting allowance 24 on the second sidewall surface 22 (indicated by cross-hatching in FIG. 4). In this example, by setting the center of rotation $O_1$ of the first milling tool 41 to a position shifted toward the first sidewall surface 21, the predetermined cutting allowance 24 is left on the second sidewall surface 22. When the milling tool 41 is used for cutting, the body portion 31 on the first sidewall surface 21 is cut by the cutting edges 45 of the milling tool 41, and at the same time, the body portion 31 on the second sidewall surface 22 side is also cut. Contrary to the first sidewall surface 21 side, the body portion 31 on the second sidewall surface 22 side is cut by the cutting edges 45 from the obtuse angle side to the acute angle side. This may cause an acute angle corner 24b of the cutting allowance 24 to be chipped. The thickness (length in the circumferential direction) of the cutting allowance 24 is set to a thickness that prevents chips on the cutting allowance 24 from reaching the second sidewall surface 22.

The thickness of the cutting allowance 24 may be adjusted by a shift amount $d_1$ of the center of rotation $O_1$ of the milling tool 41. The shift amount $d_1$ of the milling tool 41 may be appropriately set so as to prevent chips on the cutting allowance 24 from reaching the second sidewall surface 22. For example, the shift amount $d_1$ may be 1 mm or more, and further, 2 mm or more. In this example, the shift amount $d_1$ of the milling tool 41 is set to 3 mm. The upper limit of the shift amount $d_1$ of the milling tool 41 may vary depending on the size of the opening 20 to be formed. For example, the upper limit may be 6 mm or less, and further, 5 mm or less.

(Post-Machining Step)

Figure 5:
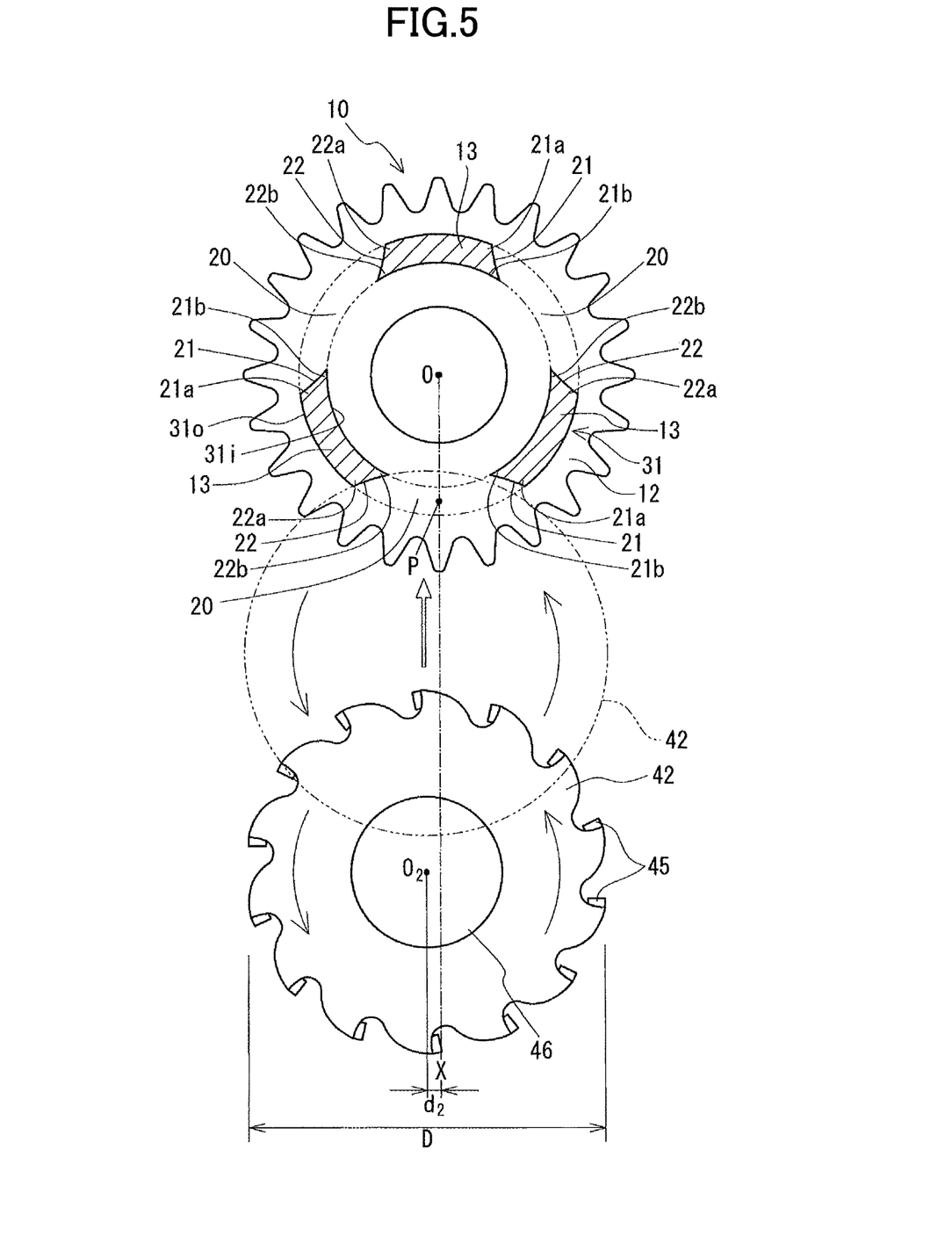
FIG. 5 is a schematic view that depicts a post-machining step according to an embodiment.

In the post-machining step, as illustrated in FIG. 5, the second milling tool 42 is used, and the second sidewall surface 22 is formed by rotating the second milling tool 42 so as to cause cutting edges 45 to cut the body portion 31 from the acute angle side (side on which the acute angle corner 22b is formed) to the obtuse angle side (side on which an obtuse angle corner 22a is formed). The second milling tool 42 is a staggered tooth side milling cutter, as with the first milling tool 41 used in the above-described pre-machining step (see FIG. 4). The cutting edges 45 are reversed from those of the first milling tool 41. The second milling tool 42 rotates in the reverse direction from the first milling tool 41, namely rotates to the left (counter clockwise). The second milling tool 42 illustrated in FIG. 5 is a side milling cutter that has the same shape and size as those of the first milling tool 41, but is flipped and attached to the rotating shaft 46. A center of rotation $O_2$ of the milling tool 42 is set to a position shifted from the centerline X toward the second sidewall surface 22 side (toward the left side of FIG. 4).

When the second milling tool 42 is used for cutting, the second milling tool 42 is horizontally moved in parallel to the centerline X and enters from the outer circumferential surface 31o side of the body portion 31, with the center of rotation $O_2$ being shifted toward the second sidewall surface 22 side. Accordingly, the cutting allowance 24 (see FIG. 4) is cut by the cutting edges 45 of the milling tool 42, and the first sidewall surface defining the opening 20 is thereby formed. At this time, the second sidewall surface 22 having a circular arc-shape is formed along the rotation trajectory (indicated by a long-dash double-short-dash line in FIG. 5) of the cutting edges 45 of the milling tool 42. Further, the obtuse angle corner 22a having an obtuse angle formed by the second sidewall surface 22 and the outer circumferential surface 31o, and the acute angle corner 22b having an acute angle formed by the second sidewall surface and the inner circumferential surface 31i are formed.

In this example, the outer diameter D of the second milling tool 42 is the same as that of the first milling tool 41, and a shift amount $d_2$ of the center of rotation $O_2$ of the milling tool 42 is also set to the same (3 mm) as the shift amount $d_1$ (see FIG. 4) of the milling tool 41. Therefore, the radius of curvature of the second sidewall surface 22 is the same as that of the first sidewall surface 21, and the first sidewall surface 21 and the second sidewall surface 22 are symmetrically formed with respect to the centerline X. Further, the center of rotation $O_2$ of the milling tool 42 is set to a position shifted toward the second sidewall surface 22 side relative to the center of rotation $O_1$ of the milling tool 41. Accordingly, the first sidewall surface 21 is not cut by the cutting edges 45 of the milling tool 42.

With the above-described steps, the opening 20 is formed in the body portion 31 of the green compact 10. If the height in the upper-lower direction of the opening 20 to be formed is smaller than the thickness L of the milling tools 41 and 42, the height positions of the milling tools 41 and 42 are adjusted, and the body portion 31 is repeatedly cut until the height of the opening 20 reaches a predetermined height in the pre-machining step and the post-machining step. By forming the rest of openings 20 in the above manner, the planetary carrier 1 having a configuration in which the openings 20 are formed between the column portions 13 as illustrated in FIG. 5 is produced.

After the machining, the green compact 10 is sintered. As a result, a sintered body is obtained as the planetary carrier 1. As sintering conditions, well-known conditions suitable for the composition of the metal powder can be used. For example, when the metal powder is iron-based powder, the sintering temperature may be greater than or equal to 1,100° C. to less than or equal to 1,400° C., and further, greater than or equal to 1,200° C. to less than or equal to 1,300° C. The sintering time may be greater than or equal to 15 minutes to less than or equal to 150 minutes, and further, greater than or equal to 20 minutes to less than or equal to 60 minutes.

Effect of Embodiments

The machining method according to the above-described embodiments exhibits the following effect.

When an opening 20 is formed in the green compact 10, the first milling tool 41 is used in the pre-machining step (see FIG. 4), and the first sidewall surface 21 is formed by rotating the milling tool 41 so as to cause the cutting edges 45 to cut the body portion from the acute angle to the obtuse angle. Then, in the post-machining step (see FIG. 5), the second milling tool 42 is used, and the second sidewall surface 22 is formed by rotating the second milling tool 42 so as to cause the cutting edges 45 to cut the body portion from the acute angle to the obtuse angle. Because both the first sidewall surface 21 and the second sidewall surface 22 are cut by the cutting edges 45 from the acute angle side to the obtuse angle side, it is possible to minimize chipping on the acute angle corners 21b and 22b of the first sidewall surface 21 and the second sidewall surface 22. Further, in the pre-machining step, the cutting allowance 24 is left on the second sidewall surface 22, and in the post-machining step, the cutting allowance 24 of the second sidewall surface 22 is cut. Therefore, even if the acute angle corner 24b on the second sidewall surface 22, from which the cutting edges 45 exit, is chipped, the chipped acute angle corner 24b of the cutting allowance 24 is removed. Accordingly, no chip remains on the acute angle corner 22b of the second sidewall surface 22.

Further, by using the staggered tooth side milling cutters as the first and second milling tools 41 and 42, the cutting resistance can be reduced, and thus, the occurrence of chips can be minimized.

Application of Embodiments

The machining method according to the embodiments may be preferably used to form openings in an unsintered green compact. For example, the machining method according to the embodiments may be preferably applied to a sintered component such as a planetary carrier.

The following clauses are further disclosed with respect to the above-described embodiments of the present disclosure.

[Clause 1]

A method for manufacturing a planetary carrier that has a plurality of column portions and plate portions, the plate portions being formed on both ends of the column portions and openings being formed between the column portions, the method including:

a preparation step of preparing a green compact by integrally forming the plate portions on both ends of a body portion having a circular tubular shape;

a machining step of forming the openings through the body portion by using a milling tool to cut the body portion of the green compact, so as to form the column portions between the openings; and a sintering step of sintering the machined green compact, wherein, in the machining step, among inner wall surfaces defining an opening, respective cut surfaces are defined as a first sidewall surface and a second sidewall surface, the respective cut surfaces being cut by cutting edges on an outer periphery of the milling tool and the second sidewall surface being opposite the first sidewall surface, a side from which the milling tool enters is defined as an outer circumferential surface of the body portion, a surface opposite to the outer circumferential surface is defined as an inner circumferential surface of the body portion, a corner where the first sidewall surface or the second sidewall surface and the outer circumferential surface meet is defined as an obtuse angle corner, a corner where the first sidewall surface or the second sidewall surface and the inner circumferential surface meet is defined as an acute angle corner, and the milling tool includes a first milling tool and a second milling tool, and wherein the machining step includes a pre-machining step of using the first milling tool, and forming the first sidewall surface by rotating the first milling tool so as to cause cutting edges of the first milling tool to cut the body portion from the acute angle corner to the obtuse angle corner, while leaving a cutting allowance on the second sidewall surface; and a post-machining step of using the second milling tool whose cutting edges are reversed from the cutting edges of the first milling tool, and forming the second sidewall surface by rotating the second milling tool so as to cause the cutting edges of the second milling tool to cut the cutting allowance from the acute angle corner to the obtuse angle corner.

In the above method for manufacturing a planetary carrier according to clause 1, it is possible to form an opening in the body portion of the green compact without chipping the sidewall surfaces of the opening. Accordingly, a planetary carrier having no chip on the sidewall surfaces of each of the column portions can be manufactured. Further, the column portions and the both plate portions can be integrally formed.

[Clause 2]

The planetary carrier manufactured by the method according to clause 1.

The planetary carrier according to clause 2 has no chip on the sidewall surfaces of each of the column portions. Further, the column portions and the both plate portions are integrally formed.

DESCRIPTION OF REFERENCE NUMERALS 1 planetary carrier (sintered component)
10 green compact (workpiece)
100 green compact
11, 12 plate portions
13 column portion
15 boss
15s splines 16 gear teeth
20 opening
21 first sidewall surface
22 second sidewall surface
21a, 22a obtuse angle corners
21b, 22b, 24b acute angle corners
24 cutting allowance
31 body portion
31o outer circumferential surface
31i inner circumferential surface
40 milling tool
41 first milling tool
42 second milling tool
45 cutting edges
46 rotating shaft

The invention claimed is:

1. A machining method for forming an opening through a workpiece being a green compact, by moving a milling tool in a radial direction relative to the workpiece, wherein among inner wall surfaces defining the opening, respective cut surfaces are defined as a first sidewall surface and a second sidewall surface, the respective cut surfaces being cut by cutting edges on an outer periphery of the milling tool and the second sidewall surface being opposite the first sidewall surface, a side from which the milling tool enters is defined as an outer circumferential surface of the workpiece, a surface opposite to the outer circumferential surface is defined as an inner circumferential surface of the workpiece, a corner where the first sidewall surface and the outer circumferential surface meet is defined as a first obtuse angle corner, a corner where the second sidewall surface and the outer circumferential surface meet is defined as a second obtuse angle corner, a corner where the first sidewall surface and the inner circumferential surface meet is defined as a first acute angle corner, a corner where the second sidewall surface and the inner circumferential surface meet is defined as a second acute angle corner, and the milling tool includes a first milling tool and a second milling tool, the method comprising:

using the first milling tool, and forming the first sidewall surface by rotating the first milling tool so as to cause cutting edges of the first milling tool to cut the workpiece from the first acute angle corner to the first obtuse angle corner, while leaving a cutting allowance on the second sidewall surface; and using the second milling tool whose cutting edges are reversed from the cutting edges of the first milling tool, and forming the second sidewall surface by rotating the second milling tool so as to cause the cutting edges of the second milling tool to cut the cutting allowance from the second acute angle corner to the second obtuse angle corner, a rotation direction of the second milling tool being opposite to a rotation direction of the first milling tool, a direction in which the first milling tool moves to cut the workpiece being a same as a direction in which the second milling tool moves to cut the workpiece.

2. The machining method according to claim 1, wherein the first milling tool and the second milling tool are staggered tooth side milling cutters.

3. The machining method according to claim 1, wherein the workpiece is the green compact for a planetary carrier.

4. The machining method according to claim 1, wherein, in the forming of the first sidewall surface, a center of rotation of the first milling tool is located on a side closer to the first sidewall surface relative to a centerline that passes through a center in a circumferential direction of the opening and a center of the outer circumferential surface, and in the forming of the second sidewall surface, a center of rotation of the second milling tool is located on a side closer to the second sidewall surface relative to the centerline.

5. The machining method according to claim 1, wherein the cutting allowance is determined by a shift amount of a center of rotation of the first milling tool, the shift amount being 1 mm or more and 6 mm or less.

6. A method for manufacturing a planetary carrier that has a plurality of column portions and plate portions, the plate portions being formed on both ends of the column portions and openings being formed between the column portions, the method comprising:

preparing a green compact by integrally forming the plate portions on both ends of a body portion having a circular tubular shape;

forming the openings through the body portion by using a milling tool to cut the body portion of the green compact, so as to form the column portions between the openings; and sintering the machined green compact, wherein, in the forming of the openings, among inner wall surfaces defining a first one of the openings, respective cut surfaces are defined as a first sidewall surface and a second sidewall surface, the respective cut surfaces being cut by cutting edges on an outer periphery of the milling tool and the second sidewall surface being opposite the first sidewall surface, a side from which the milling tool enters is defined as an outer circumferential surface of the body portion, a surface opposite to the outer circumferential surface is defined as an inner circumferential surface of the body portion, a corner where the first sidewall surface and the outer circumferential surface meet is defined as a first obtuse angle corner, a corner where the second sidewall surface and the outer circumferential surface meet is defined as a second obtuse angle corner, a corner where the first sidewall surface and the inner circumferential surface meet is defined as a first acute angle corner, a corner where the second sidewall surface and the inner circumferential surface meet is defined as a second acute angle corner, and the milling tool includes a first milling tool and a second milling tool, and wherein the forming of the openings includes using the first milling tool, and forming the first sidewall surface by rotating the first milling tool so as to cause cutting edges of the first milling tool to cut the body portion from the first acute angle corner to the first obtuse angle corner, while leaving a cutting allowance on the second sidewall surface; and using the second milling tool whose cutting edges are reversed from the cutting edges of the first milling tool, and forming the second sidewall surface by rotating the second milling tool so as to cause the cutting edges of the second milling tool to cut the cutting allowance from the second acute angle corner to the second obtuse angle corner, a rotation direction of the second milling tool being opposite to a rotation direction of the first milling tool, a direction in which the first milling tool moves to cut the workpiece being a same as a direction in which the second milling tool moves to cut the workpiece.

7. The method for manufacturing the planetary carrier according to claim 6, wherein, in the forming of the first sidewall surface, a center of rotation of the first milling tool is located on a side closer to the first sidewall surface relative to a centerline that passes through a center in a circumferential direction of the opening and a center of the outer circumferential surface, and in the forming of the second sidewall surface, a center of rotation of the second milling tool is located on a side closer to the second sidewall surface relative to the centerline.

8. The method for manufacturing the planetary carrier according to claim 6, wherein the cutting allowance is determined by a shift amount of a center of rotation of the first milling tool, the shift amount being 1 mm or more and 6 mm or less.

* * * * *